(12) United States Patent
Haederli et al.

(10) Patent No.: US 10,044,185 B2
(45) Date of Patent: Aug. 7, 2018

(54) METHOD AND APPARATUS FOR OPERATING A CONVERTER IN A CONVERTER-BASED POWER DISTRIBUTION SYSTEM, AND POWER DISTRIBUTION SYSTEM HAVING A PLURALITY OF CONVERTER-BASED POWER TRANSMISSION UNITS

(71) Applicant: ABB Technology AG, Zurich (CH)

(72) Inventors: Christoph Haederli, Zurich (CH);
Marco Thoma, Schafisheim (CH);
Tobias Thurnherr, Baden (CH)

(73) Assignee: ABB Schweiz AG, Baden (CH)

( * ) Notice: Subject to any disclaimer, the term of this patent is extended or adjusted under 35 U.S.C. 154(b) by 147 days.

(21) Appl. No.: 15/050,017

(22) Filed: Feb. 22, 2016

(65) Prior Publication Data

US 2016/0276829 A1    Sep. 22, 2016

Related U.S. Application Data

(63) Continuation of application No. PCT/EP2014/067136, filed on Aug. 11, 2014.

(30) Foreign Application Priority Data

Aug. 23, 2013  (EP) .................................... 13181489

(51) Int. Cl.
*H02J 3/00* (2006.01)
*H02J 3/01* (2006.01)
(Continued)

(52) U.S. Cl.
CPC ................. *H02J 3/00* (2013.01); *H02J 3/01* (2013.01); *H02J 3/381* (2013.01); *H02M 5/04* (2013.01); *H02M 7/44* (2013.01); *Y02E 40/40* (2013.01)

(58) Field of Classification Search
CPC ........... H02M 5/04; H02M 5/22; H02M 5/225
See application file for complete search history.

(56) References Cited

U.S. PATENT DOCUMENTS 5,065,303 A     11/1991  Nguyen et al.
7,796,412 B2 *   9/2010  Fornage ................ H02M 3/285
                                                  323/906
(Continued)

FOREIGN PATENT DOCUMENTS

CN        201332278 Y    10/2009
EP        2262089 A1      5/2010

OTHER PUBLICATIONS

"International Preliminary Report on Patentability," PCT/EP2014/067136, dated Dec. 11, 2015, 5 pgs., English Translation.

(Continued)

*Primary Examiner* — Jeffrey Zweizig
(74) *Attorney, Agent, or Firm* — Taft Stettinius & Hollister LLP; J. Bruce Schelkopf

(57) ABSTRACT

The invention relates to a method for operating a converter in an energy distribution system, wherein, by means of the converter, an electrical energy provided by a source is fed into an AC electricity network at a coupling point (E) or electrical energy is drawn from the AC electricity network at the coupling point (E), wherein the AC electricity network is coupled to further converters for feeding in or drawing electrical energy, wherein the converter has an inverter provided with power switches in order to provide an electrical variable, comprising providing one or a plurality of system state variables indicating a system state of the electricity network, selecting one of a plurality of commutation patterns depending on the one or the plurality of system state variables, and driving the inverter according to the selected commutation pattern.

20 Claims, 7 Drawing Sheets

(51) Int. Cl.
*H02J 3/38* (2006.01)
*H02M 5/04* (2006.01)
*H02M 7/44* (2006.01)

(56) References Cited

U.S. PATENT DOCUMENTS

| | | | | |
|---|---|---|---|---|
| 7,986,539 B2* | 7/2011 | Fornage | ................... | G05F 1/67 |
| | | | | 307/140 |
| 8,217,533 B2* | 7/2012 | Jones | ................ | H02J 3/01 |
| | | | | 307/82 |
| 9,160,170 B2* | 10/2015 | Jensen | ................ | H02J 3/01 |
| 2009/0322082 A1 | 12/2009 | Wagoner et al. | | |
| 2010/0156192 A1 | 6/2010 | Wang et al. | | |
| 2011/0260547 A1 | 10/2011 | Wang et al. | | |
| 2013/0033907 A1 | 2/2013 | Zhou et al. | | |

OTHER PUBLICATIONS

"International Search Report," PCT/EP2014/067136, dated Oct. 1, 2014, 2 pgs., English Translation.

* cited by examiner

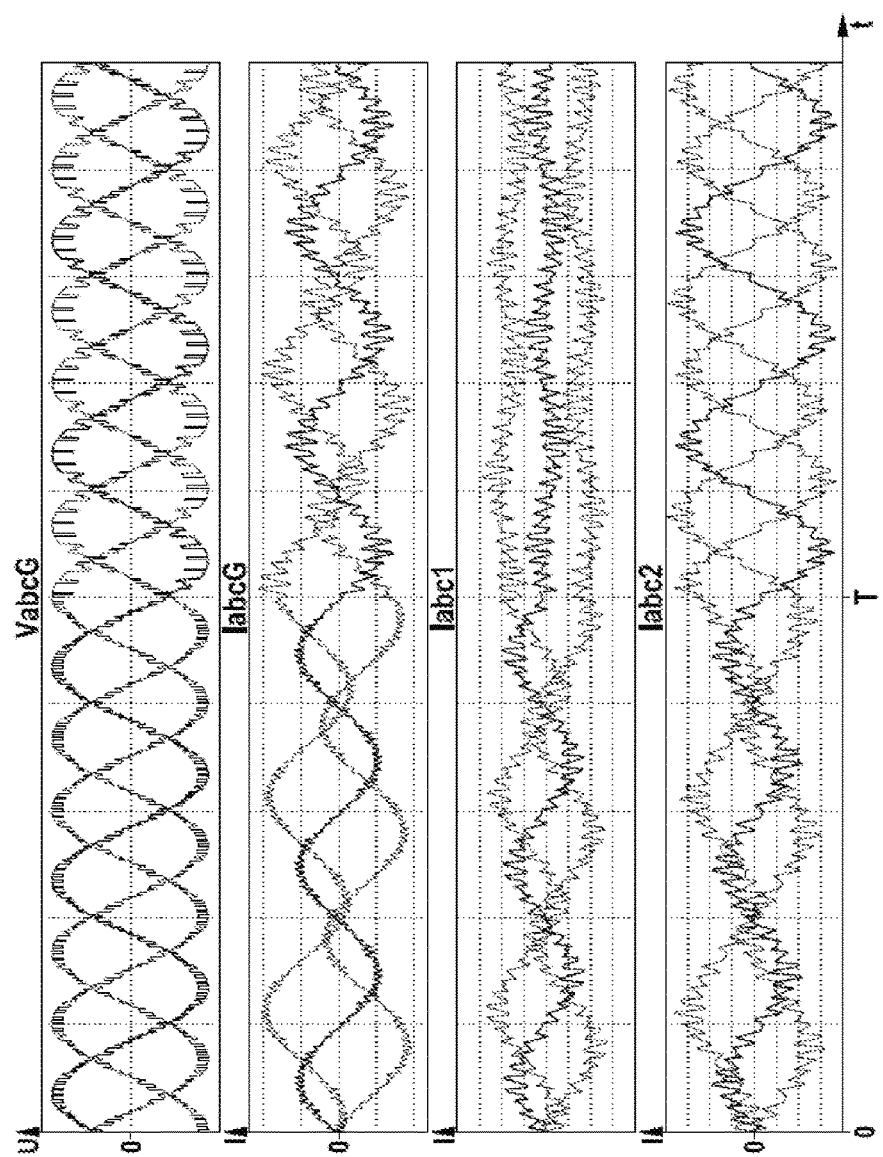

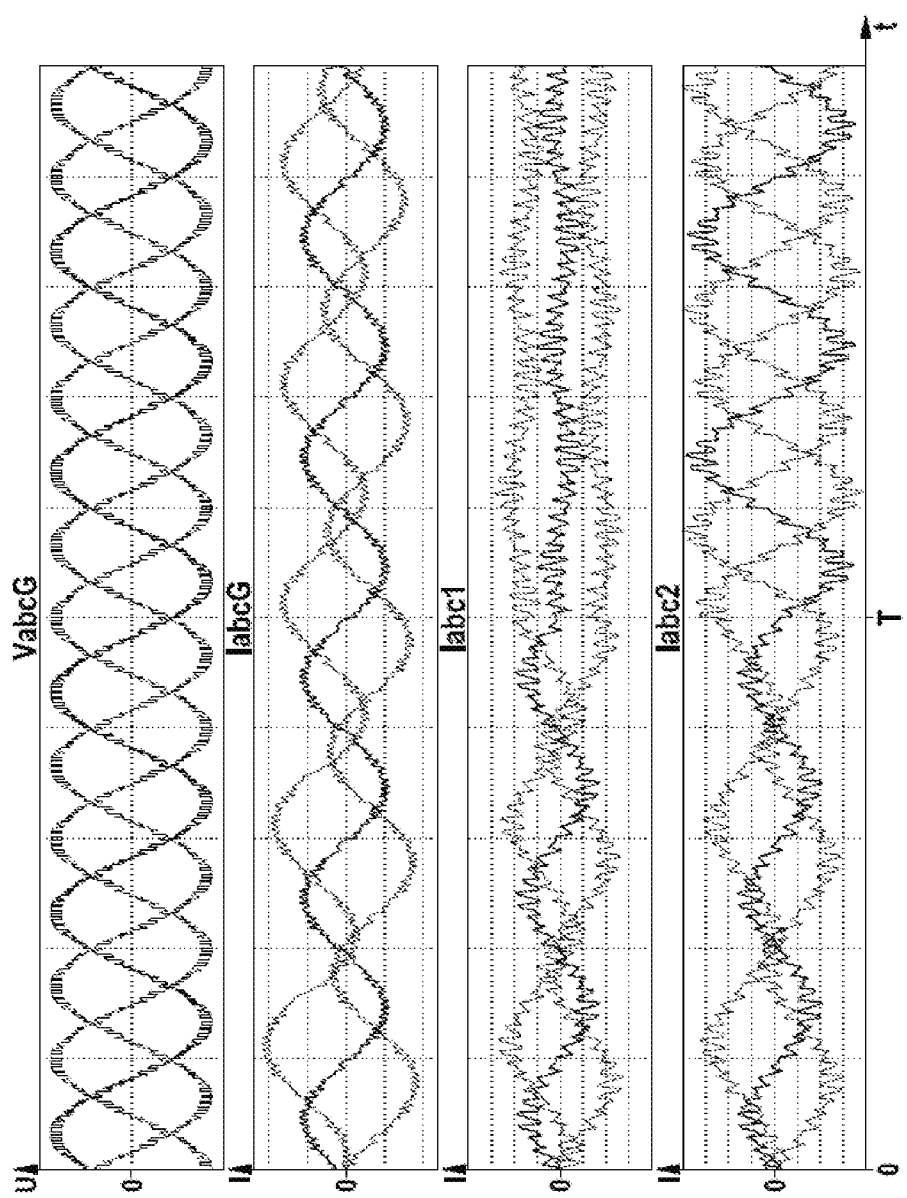

US 10,044,185 B2

METHOD AND APPARATUS FOR OPERATING A CONVERTER IN A CONVERTER-BASED POWER DISTRIBUTION SYSTEM, AND POWER DISTRIBUTION SYSTEM HAVING A PLURALITY OF CONVERTER-BASED POWER TRANSMISSION UNITS

TECHNICAL FIELD

The invention relates to electricity networks of energy distribution systems comprising a multiplicity of converter-based energy transmission units, wherein electrical energy is introduced into the electricity network by the energy transmission units with the aid of converters. The invention furthermore relates to measures for reducing harmonics in the electricity network.

PRIOR ART

In the course of decentralized generation and supply of energy, converter-based energy transmission units, e.g. in the form of electricity generators, are being arranged in increasing numbers on AC electricity networks and, by virtue of their construction and their operation, they can bring about harmonics in the electricity network to a great extent. Furthermore, the frequently changing configuration of the energy distribution system results in a varying impedance, which can give rise to resonances in different varying frequency ranges.

However, it is necessary to permit only a small proportion of the transmitted harmonics at the connection point of the energy distribution system to an electricity distribution network. For this reason, hitherto in order to avoid an excessively high proportion of harmonics in the electricity distribution network the individual converters at the energy transmission units have been provided with filters that are intended to reduce the proportion of harmonics. However, since the electrical properties of the energy distribution system, in particular the impedance of the electricity network, possibly vary, states which cannot be afforded tolerance at the connection point of the energy distribution system into the general electricity distribution network arise on account of resonances and/or amplifications of superposed harmonics even with proper filtering at the coupling points. Hitherto, filter circuits have been provided at each converter, said filter circuits being dimensioned such that critical states can be avoided as much as possible.

The documents US 2010/0156192 A1 and US 2011/0260547 A1 disclose a system comprising a control unit having two pulse width modulation units, wherein each of the pulse width modulation units receives a basic frequency and a carrier signal. These are used to generate a PWM pattern that is fed to a corresponding network side converter. The control unit interleaves the carrier signals, the basic frequencies or a combination thereof and generates interleaved PWM patterns for two converters. This satisfies the requirements with regard to a low proportion of harmonics at a connection point of an energy distribution system for a plurality of wind turbines.

The document U.S. Pat. No. 5,065,303 A discloses suppressing a proportion of harmonics with the aid of a series connection of two transformers.

The document US 2009/0322082 A1 discloses a wind turbine energy generating system comprising a converter control unit, which operates the converter system in order to reduce the proportion of harmonics at a connection point. In this system, the harmonics are suppressed by parallel converters on a multiple winding of a turbine transformer.

The document CN 2013/32278 Y relates to an energy distribution system for a multiplicity of converter-based energy transmission units with power factor correction. The system is designed to reduce voltage fluctuations caused by the wind generators and to provide voltage regulation at the coupling points. In this way harmonics can be eliminated and an independent decentralized control of the energy distribution system can be ensured.

The document EP 2 262 089 A1 discloses a wind turbine electricity generating system comprising a plurality of converter threads connected to a generator, wherein a converter controller is provided, which provides each of the converter threads with one of a plurality of switching patterns based in part on the monitored operating properties of the generator. Interleaved operation of the converters with switching patterns that cause each converter to be driven with phase-offset drive signals results in a reduction of the proportion of harmonics by self-cancellation of the harmonics.

It is an object of the present invention to provide a converter for an energy transmission unit and also an energy distribution system which are operable such that a minimum proportion of harmonics occurs in an AC electricity network when electrical energy is fed in or drawn.

DISCLOSURE OF THE INVENTION

This object is achieved by means of the method for operating a converter in an energy distribution system as claimed in claim 1 and also by the converter, the energy distribution system and the method for operating converters in an energy distribution system as claimed in the alternative independent claims.

Further advantageous embodiments of the present invention are specified in the dependent claims.

In accordance with a first aspect, a method for operating a converter in an energy distribution system is provided, wherein by means of the converter, an electrical energy provided by a source is fed into an AC electricity network at a coupling point or electrical energy is drawn from the AC electricity network at the coupling point, wherein the AC electricity network is coupled to further converters for feeding in or drawing electrical energy, wherein the converter has an inverter provided with power switches in order to provide an electrical variable. The method comprises the following steps:

provide one or a plurality of system state variables indicating a system state of the electricity network;

selecting one of a plurality of commutation patterns depending on a selection scheme and depending on the one or the plurality of system state variables; and driving the inverter according to the selected commutation pattern.

One concept of the above method for operating a converter consists—depending on a system state of the energy distribution system as indicated by the one or the plurality of system state variables—in selecting one of a plurality of commutation patterns for a converter and driving the latter accordingly. As a result, in particular the system state of the electricity network can be taken into account, said system state having a great influence on the proportion of harmonics in particular on account of varying resonances. In this way, it is possible for commutation patterns which are provided by a plurality of converters and whose fundamental frequencies of the electrical variable are in phase to be selected such that harmonics of a specific harmonic component on the electricity network at least partly compensate for one another, in order thus to reduce the total proportion of harmonics in the electricity network. Furthermore, it is possible to select the commutation patterns such that they do not include or bring about any harmonic components which can lead to a resonance. This is possible for example by using an SHE method (SHE: Selective Harmonic Elimination).

The commutation pattern results from the use of a commutation method and predefines a general switching specification for the switching of power semiconductor switches of the inverter in order to provide electrical variables having predefined profiles on the output side and/or to bring about a specific electrical behavior on the input side. In this case, voltage values obtained on the input side in a specific sequence are switched through to the output, such that the output-side voltage profile is selectable as a result. The commutation pattern for achieving the voltage profile can be fixedly predefined as a switching scheme or can be determined with the aid of a real-time calculation, such as e.g. in the case of a carrier-based pulse width modulation.

Furthermore, the one of the plurality of commutation patterns can be selected depending on identification information identifying the converter.

In particular, the one or the plurality of system state variables can be received or detected via an external communication connection.

In accordance with one embodiment, the one or the plurality of system state variables can comprise at least one of the following variables:
  an indication about an active and/or reactive power present at the coupling point;
  an indication about a harmonic spectrum of the electrical variable at a connection point or the coupling point in the electricity network;
  an indication about an impedance or a frequency-dependent impedance profile of the electricity network at at least one point of the AC electricity network;
  an indication about an active and/or reactive power transmitted by the electricity network; and
  an indication about a configuration of the energy distribution system, such as e.g. an indication concerning the incremental expansion of the system, concerning the failure of individual regions (e.g. rings or strings), indications concerning a topology reconfiguration, an indication about the failure of individual energy transmission units, and an indication about supplementarily connecting and/or disconnecting active and/or passive compensation components and/or redundant components, such as parallel transformers and the like.

Furthermore, the plurality of selectable commutation patterns, upon provision of an in-phase fundamental of the electrical variable, can bring about harmonics which have different phase angles and are provided in particular in antiphase.

Furthermore, the plurality of commutation patterns can differ from one another in terms of a switching pattern and/or a switching frequency.

It can be provided that the one or the plurality of system state variables comprise(s) an indication about a resonant frequency of the energy distribution system, wherein the commutation pattern is selected such that no excitation takes place at the resonant frequency.

Furthermore, the commutation pattern can comprise a provided switching scheme or an, in particular carrier-based, switching scheme generated online.

In accordance with a further aspect, provision is made of a converter for an energy distribution system for feeding electrical energy provided by a source into an AC electricity network at a coupling point or for drawing electrical energy from the AC electricity network at the coupling point, wherein further converters are coupled to the AC electricity network for feeding in or drawing electrical energy, wherein the converter has an inverter provided with power switches for providing an electrical variable, and a control unit for driving the inverter, wherein the control unit is designed
  to obtain one or a plurality of system state variables indicating a system state of the AC electricity network;
  to select one of a plurality of commutation patterns depending on the one or the plurality of system state variables; and
  to drive the inverter according to the selected commutation pattern.

In particular, the control unit can be designed to obtain the one or the plurality of system state variables via an external communication connection, wherein the control unit has a detection unit in order to detect the one or the plurality of system state variables.

In accordance with one embodiment, a storage unit for storing identification information can be provided, such that one of the plurality of commutation patterns is selected depending on the identification information of the converter.

In accordance with a further aspect, provision is made of an energy transmission system comprising the above converter and comprising a load that obtains electrical energy via the converter, or an electrical energy source that feeds electrical energy into the AC electricity network via the converter.

In accordance with a further aspect, provision is made of an energy distribution system comprising a plurality of the above converters for a plurality of sources of electrical energy, wherein the respective converters are provided with different selection schemes such that, in the case of an indicated system state, the converters select commutation patterns which result in at least one partial cancellation for at least one harmonic of the electrical variable on the AC electricity network.

By means of the energy distribution system comprising a plurality of converters operated in this way, what can be achieved, then, by means of the selection of different commutation patterns in the converters in accordance with the selection scheme is that given the same phase and frequency of the fundamental of current and/or voltage in the electricity network, the resulting harmonics are introduced in phase or in antiphase, such that the total proportion of harmonics is reduced either overall or in a specific frequency range.

Furthermore, the converters can be operated with a respective commutation pattern that is dependent on the location of their respective coupling point in the AC electricity network.

In particular, at least two of the converters can be designed to be operated with complementary commutation patterns which bring about in antiphase the electrical variables for at least one harmonic in the AC electricity network.

In accordance with one embodiment, a detection unit can be provided in order to detect the system state and to communicate it to one or a plurality of the converters.

At least one filter unit can be provided in order to carry out a filtering of harmonics in the AC electricity network depending on the system state.

Furthermore, the converters can be implemented in each case with an assigned selection scheme, such that they are operated with commutation patterns which minimizes the resulting defined harmonic spectrum on the AC electricity network at least in a predefined frequency range.

In accordance with a further aspect, provision is made of a method for operating converters in the above energy distribution system, wherein commutation patterns are selected by each of the converters in the case of an indicated system state in accordance with the assigned selection scheme so as to result in at least one partial cancellation for at least one harmonic of the electrical variable on the AC electricity network.

BRIEF DESCRIPTION OF THE DRAWINGS

Preferred embodiments of the present invention are explained in greater detail below with reference to the accompanying drawings, in which:

FIG. 7 shows current and voltage profile diagrams for the case of two exemplary converters; and FIG. 8 shows current and voltage profile diagrams for the case of two exemplary converters.

DESCRIPTION OF EMBODIMENTS

Figure 1:
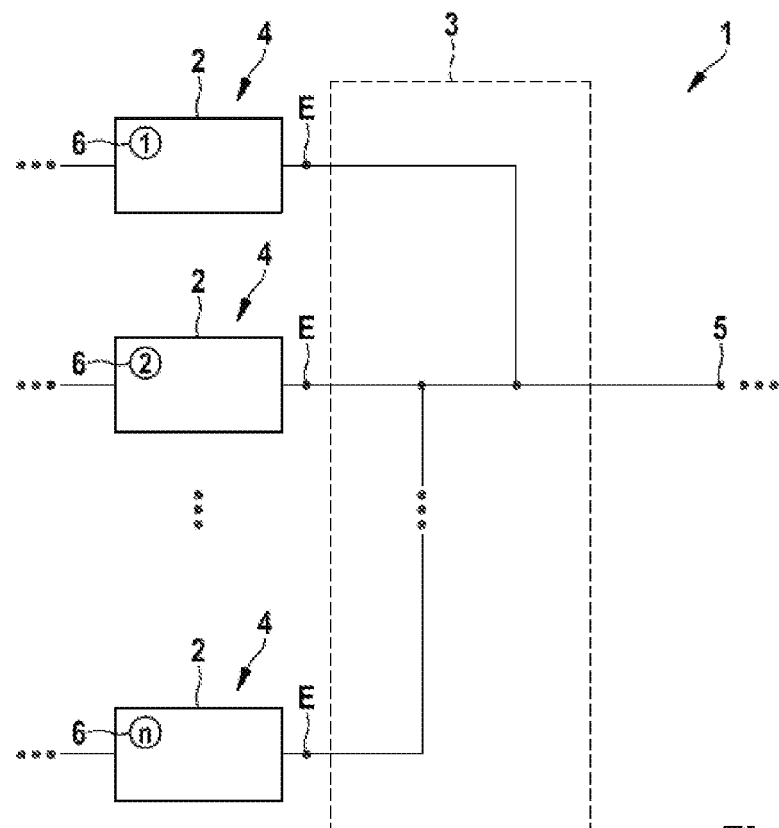
FIG. 1 shows a schematic illustration of an energy distribution system comprising a plurality of converter-based coupling points.

FIG. 1 shows an energy distribution system 1 comprising a plurality of converter-based energy transmission units 4. The energy transmission unit 4 can be designed to feed electrical energy into an AC electricity network 3 at a coupling point E, said AC electricity network corresponding to a single- or polyphase AC electricity network. The electrical energy can be provided by generators, such as, for example, wind power installations, by solar systems and similar energy-generating systems, or else be drawn from a further network that provides electrical energy.

Furthermore, the energy transmission unit 4 can also be provided for the connection of a load, wherein the energy transmission unit 4 draws electrical energy from the AC electricity network 3 and makes it available to the load in a suitable manner. The energy transmission unit 4 can furthermore be embodied as a STATCOM that obtains active power from the AC electricity network 3 and makes reactive power available.

The energy distribution system 1 can be an electricity network for the coupling of wind turbines in a wind farm. Furthermore, the energy distribution system 1 can comprise a railroad network or a railroad transmission network, a distribution network, an industrial network, a ship network, an on-board network, an island network, a solar network, a network with HVDC coupling or the like. In principle, the energy distribution system 1 can comprise a network into which energy is fed by means of converters and/or from which energy is drawn by means of converters.

The energy transmission units 4 comprise converters 2, which are connected to the electricity network 3 via coupling points E. The converters 2 substantially serve for coupling the electrical energy made available with phase-synchronous voltage into the electricity network 3 or, in the case of a connected load, for coupling out the required electrical energy from the AC electricity network 3. The feeding-in is carried out in order to provide the electrical energy called up by the electricity network 3 or the electrical energy provided for being conducted through the electricity network 3 to a connection point 5.

At the connection point 5, the electricity network 3 can be connected to a further electricity distribution network (not shown) in order to feed the electrical energy to remote loads (not shown) or to obtain the electrical energy from remote energy sources.

Figure 2:
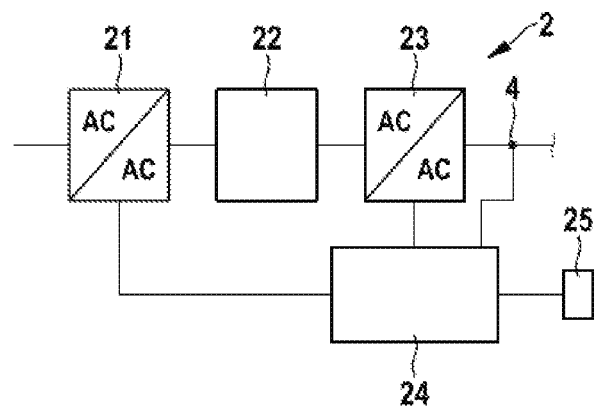
FIG. 2 shows an illustration of a converter for an energy distribution system according to FIG. 1.

One possible converter 2 for a source of electrical energy as an energy transmission unit 4 is illustrated in greater detail in FIG. 2. The converter 2 is designed to obtain electrical energy in the form of a single- or polyphase AC current from a generator-based electricity generator, such as a wind power installation, for example. Said electrical energy is fed to a first inverter 21, which converts the electrical energy into a transformation frequency suitable for a downstream transformer 22.

The transformer 22 firstly serves for galvanic isolation between an input side (primary side) and an output side (secondary side) and secondly converts the AC voltage provided into an AC voltage within a predefined voltage range.

In a second inverter 23 arranged on the secondary side of the transformer 22, the electrical energy obtained from the transformer 22 is brought to phase correspondence with the alternating electrical variable present at the coupling point E. The feeding-in is carried out in a known manner by means of corresponding driving of the further inverter 23, such that an energy flow in the direction of the coupling point E can take place.

The first and second inverters 21, 23 are operated with the aid of an inverter controller 24. The inverter controller 24 firstly serves for driving the first inverter 21 for providing an alternating electrical variable having a frequency provided for the primary side of the transformer 22. Since the second inverter 23 is provided for transmitting the electrical energy into the electricity network 3, the inverter controller 24 secondly serves for detecting the phase angle of an electrical variable, in particular of the voltage, at the coupling point E and for providing a corresponding AC voltage having a suitable phase angle, such that an energy flow into the electricity network 3 can take place.

The second inverter 23 is embodied with power semiconductor switches which are switched by the inverter controller 24 in a suitable manner in accordance with a commutation pattern. The commutation pattern predefines a general switching specification for the switching of the power semiconductor switches in order to provide corresponding electrical variables on the output side of the second inverter 23, in this case, voltage values obtained on the input side in a specific sequence are switched through to the output, such that the output-side voltage profile is selectable as a result. Although the fundamental of the electrical variable to be coupled in is defined, there are a number of degrees of freedom for producing this by means of various commutation patterns.

The switching of the power semiconductor switches in the first and second inverters 21, 23 gives rise not only to the intended output-side alternating variables, but also to harmonics based thereon, which burden the electricity network 3 and are therefore undesired. The commutation pattern thus brings about not only the provision of an electrical voltage at the coupling point E at the predefined network frequency, but also the introduction of harmonics which can be superposed with and amplify harmonics introduced at other coupling points E. Moreover, depending on an in particular frequency-dependent impedance of the AC electricity network 3, resonances can arise if harmonics in the range of a resonant frequency of the AC electricity network 3 are superposed on one another and amplify as a result of the resonance. Since the impedance varies on account of a changing topology of the energy transmission units 4 connected to the electricity network 3 and/or of the load applied to the connection point 5, an anticipatory filtering in the range of a resonant frequency is not sufficient.

The inverter controller 24 is furthermore connected to a detection unit 25, which detects the system state of the electricity network 3 on the basis of a system state variable, in particular at the connection point 5, at which electrical energy can be transferred into a further electricity distribution network. The detection unit 25 can comprise a sensor unit or make it possible, in principle, to provide a system state variable that can indicate, in particular, a state (e.g. in the form of variable electrical variables) of the AC electricity network 3. The system state variable can also be detected at a further point within the electricity network 3, wherein the system state variable is selected such that it correlates with the system state at the connection point 5. The further point can correspond for example to a coupling point of at least two converter-based energy transmission units 4 in the electricity network 3.

For the purpose of driving the further inverter 23, the inverter controller 24 can make provision, then, for providing various commutation patterns, wherein the commutation pattern with which the second inverter 23 is driven is selected in accordance with a value of the detected system state variable or system state variable made available. For this purpose, there are stored in the inverter controller the switching schemes for a series of commutation patterns, such that these can be called up in line with demand. The commutation patterns can be selected such that harmonic frequencies in a specific range can be avoided, e.g. up to the $50^{th}$ or $100^{th}$ harmonic.

Furthermore, the commutation patterns can be selected such that they presuppose different impedance profiles as a basis for calculation and have correspondingly adapted spectra in order to attain a system state within a predefined requirement.

Providing different commutation patterns makes it possible to achieve different harmonic spectra for the different commutation patterns on the basis of a common fundamental frequency and a phase angle that is in phase with the AC electricity network 3. In particular, harmonics that are in phase and in antiphase with respect to the harmonics can be brought about. In particular, feeding a specific harmonic in phase or in antiphase into the AC electricity network 3 brings about an amplification or a compensation which can lead to an increase or reduction of the proportion of the corresponding harmonic in the AC electricity network 3.

The commutation pattern selectable by the inverter controller 24 can be generated offline or online and comprises carrier-based pulse width modulation methods, space vector modulation methods or other methods associated therewith. In particular, modulation methods based on a variable carrier frequency can also be used, as a result of which the frequency range of the main proportion of the harmonics can be manipulated.

The present impedance and/or the transmission of active and reactive power in the electricity network 3 can be used as indications about the system states.

As further indications about the system states, it is possible to use information about the present switching state of the AC electricity network 3, which information enables the inverter controller 24 to calculate all relevant resonances in the overall system, particularly in the AC electricity network 3. On the basis of this information, suitable commutation patterns can then be selected. Furthermore, the system state variable can comprise an indication about frequencies to be avoided. The selected commutation pattern can then be selected such that the harmonics having the frequency to be avoided are not generated. Furthermore, the system state variable can also correspond to a measured resonant frequency that is detected by means of a spectral analysis of the measured electrical variables.

The active power flow in the respective converter 2, the reactive power flow in the respective converter 2, the impedance of the electricity network 3, the transmission of active and/or reactive power by the electricity network 3, the topology of the connected converter-based coupling points E at the electricity network 3 and also the type of harmonic spectrum at one or a plurality of tapping points, for example at the connection point 5 or at one of the coupling points E, can be used as a system state variable. A plurality of the above system state variables can also be taken into account in the selection of the commutation patterns.

In particular, the arrangement of the converters 2 at the electricity network 3 can also be used for selecting the commutation pattern. By way of example, identification information 6 can be assigned to each of the converters 2, such that the selection of the corresponding commutation pattern is carried out on the basis of the identification information 6. In particular, in the case of consecutive identification numbers as identification information 6, the commutation patterns can be selected according to whether the identification number is even or odd. In this way, it can be ensured that the commutation patterns are selected in each case half and half in a specific manner, such that it is possible to provide the commutation patterns with harmonics in antiphase which are suitable for correspondingly compensating for their harmonic proportions relative to one another.

The active power, in particular, is an important system state variable. An active current brings about a phase shift of the voltage fundamental across a series impedance of transformers and lines, for example. The active power of an individual energy transmission unit 4 therefore brings about a phase shift of the voltage fundamental at the converter 2 relative to the voltage fundamental at a common reference point, such as the connection point, for example.

The series impedance in typical energy distribution systems is usually inductive and in this case is dominated by transformers possibly arranged in the AC electricity network. The phase angle of the voltage fundamental can thus be determined substantially by means of the active powers in the network. The phase shift between the coupling points E and the connection point 5 can be determined e.g. by the measurement of an amplitude of the active power by a transformer situated in the electricity network and the leakage inductance of said transformer. The phase shift between one of the converters and the assigned coupling point E is substantially proportionate to the amplitude of the active power of the relevant converter and the effective impedance.

Therefore, the phase angle between the converter and the connection point 5 can be determined as the sum of the two phase shifts mentioned above.

From this it is then possible to calculate the phase shift of harmonics as the N-fold multiple (wherein N corresponds to the ordinal number of the harmonics) of the phase shift of the fundamental, since the phase shift of the individual harmonics is greater by N-fold. Therefore, the phase angles of the harmonics relative to one another depend to a significant extent on the phase angle of the fundamental and thus on the active power.

Suitable commutation patterns can then be selected in such a way as to compensate for specific harmonics at the connection point 5 or at a coupling point E. In this case, it is possible to have recourse either to a plurality of power values or else only to the active power at the coupling point E of the converter. In one exemplary embodiment, in which the active power is detected only at the connection point of the converter, a preferred phase angle of individual harmonics at the coupling point E or at the connection point 5 is predefined for the converter depending on identification information. A suitable commutation pattern can be selected depending on the calculated phase shifts of the individual harmonics. In another embodiment, the phase angles of individual nodes present in the AC electricity network 3, said phase angles being calculated on the basis of the system information or, in particular, the active power, are calculated and suitable commutation patterns are distributed to the individual converters 2.

In further embodiments, in an energy transmission unit 4 it is also possible for more than one converter 2 to be assigned to a source of electrical energy, wherein the plurality of converters 2 can be driven with different commutation patterns in order that a minimum proportion of harmonics is already obtained at the coupling point E.

In addition to the converters 2, filter circuits can also be arranged between the converter 2 and the coupling point E, in order to reduce the proportion of harmonics for all or some of the harmonics.

In principle, the selection of a suitable commutation pattern depending on the system state can also be coordinated with the locally selected transformer and/or filter configuration. In this context, locally means the transformer and/or filter configuration of one energy transmission unit 4 or of a cluster of energy transmission units 4.

The detection unit 25 can be provided centrally for all the converters 2 or each of the converters 2 can be provided with a detection unit 25 assigned thereto.

The commutation patterns can be selected to reduce the proportion of individual or all harmonics. In particular, the commutation patterns can be selected such that proportions of specific harmonics are reduced.

For this purpose, the commutation patterns are selected such that they provide the harmonics with a specific phase angle, such that the phase angles of the specific harmonic mutually compensate for one another.

The selection of the commutation patterns can be carried out randomly from a set of commutation patterns provided. Furthermore, the commutation patterns can be grouped according to their phase angles of the harmonic, such that, for the purpose of reducing a proportion of a specific harmonic, the commutation patterns are selected from corresponding groups of commutation patterns in which the proportion of corresponding harmonic is reduced.

A junction point of a plurality of groups (clusters) of converter-based coupling points E can also be selected as a detection point for the system state.

In order to avoid specific resonant frequencies in the electricity network 3, the resonant frequency can also be determined by a central or local measurement or on the basis of calculations as a function of the system state and it is possible to carry out the selection of the commutation pattern in the converters 2 on the basis of the resonant frequencies determined.

Figure 3:
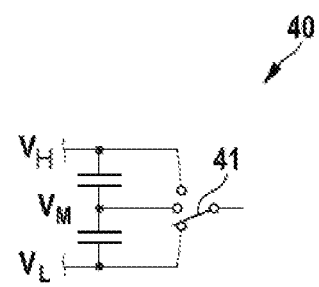
FIG. 3 shows a schematic illustration of an exemplary converter.

FIG. 3 schematically depicts a simple converter 40 as a three-level voltage converter comprising a switch 41, the switching states of which are predefinable with the aid of a commutation pattern. The converter 40 is designed to switch one of three voltage potentials to the phase output. For this purpose, the converter 40 is connected to a high supply potential $V_H$ and a low supply potential $V_L$, wherein a switching process results in switching between one of the supply potentials and a center potential $V_M$ provided.

Figure 4A:
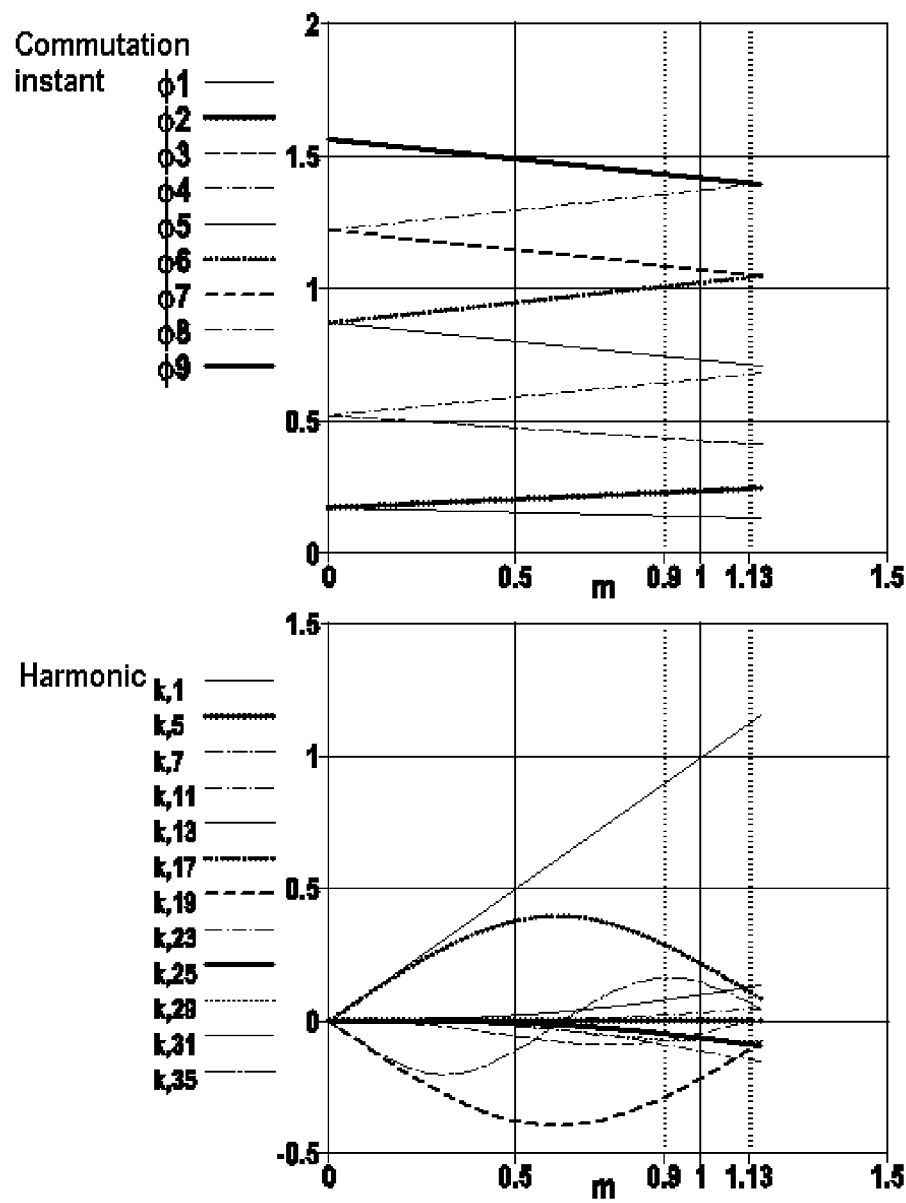
FIGS. 4a and 4b show illustrations of two commutation patterns for the converter from FIG. 3.
Figure 4B:
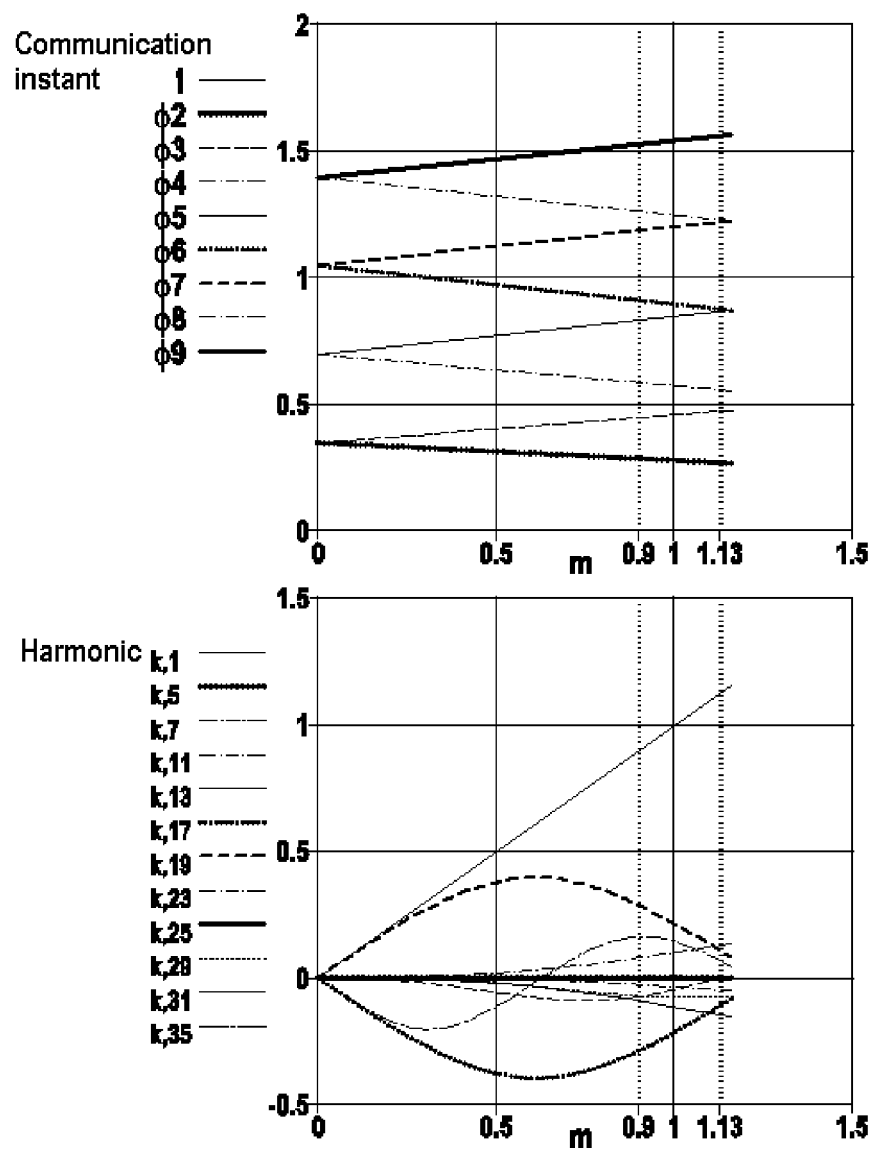

FIGS. 4a and 4b illustrate two commutation patterns and the resultant harmonic proportions of selected harmonics for an exemplary energy transmission system comprising the converter 40 from FIG. 3. FIGS. 4a and 4b show, against a degree m of driving, the profiles of successive commutation instants $\phi 1$ to $\phi 9$ as instants for a switching process, wherein for each switching process there is a change in the output voltage from one of the supply voltages $V_H$, $V_L$ to the center potential $V_M$. The commutation instants in each case indicate the time, interval in the form of a phase angle relative to the zero crossing of the voltage fundamental. A quarter-wave symmetry was used in each case for the commutation patterns indicated.

Figure 5:
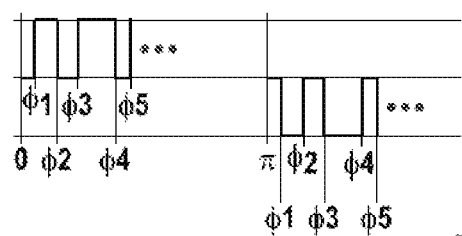
FIG. 5 shows a profile of an output voltage of the converter from FIG. 3.

In each case 9 commutation instants $\phi 1$ to $\phi 9$ are illustrated for the two commutation patterns, said commutation instants indicating the switching angles in the range of 0 to $\pi/2$ as a function of a degree m of driving. An exemplary profile of the output voltage for a degree m of driving is illustrated by the signal timing diagram in FIG. 5, which schematically illustrates the profile of the output voltage of the converter 40.

Furthermore, the bottom diagrams in each of FIGS. 4a and 4b indicate by way of example the proportion of harmonics of the $1^{st}$, $5^{th}$, $7^{th}$, $11^{th}$, $13^{th}$, $17^{th}$, $19^{th}$, $23^{rd}$, $25^{th}$, $29^{th}$, $31^{st}$ and 35th harmonic components as a function of the degree m of driving.

A phase change between the two commutation patterns is evident on the basis of the sign of the harmonic proportion of the relevant harmonic. Positive sign corresponds to a harmonic synchronous with the fundamental on the AC electricity network 3 and negative sign corresponds to a harmonic phase-shifted by 180° with respect to the fundamental on the AC electricity network 3. Therefore, harmonics having a different sign in relation to the two commutation patterns can compensate for one another. It is evident that for the two commutation patterns only a very small proportion of the $5^{th}$ and $7^{th}$ harmonics is present, the $11^{th}$, $13^{th}$, $17^{th}$, $19^{th}$ and $23^{rd}$ harmonics have mutually opposite phase angles and thereby compensate for one another;

the $25^{th}$ harmonic is practically only present in the first commutation pattern in FIG. 3a; and the $29^{th}$, $31^{st}$ and $35^{th}$ harmonics are in phase and therefore amplify one another.

With the above commutation patterns, although not all harmonics can be eliminated, an adaption to the conditions of the AC electricity network 3 is possible in order to achieve a desired system state.

It can essentially be provided that the inverter controllers 24 of the energy transmission units 4 drive the second inverters 23 independently of a central control unit. The inverter controllers 24 detect one or a plurality of system state variables and select a commutation pattern from a plurality of provided commutation patterns such that a cancellation in one, a plurality or all of the harmonic ranges is achieved by superposition of all or specific harmonics which are based on the common fundamental of the electrical variable, such as the voltage or the current, for example, in the electricity network 3. Alternatively, the information can also be detected centrally and distributed among the individual converters 2.

Figure 6:
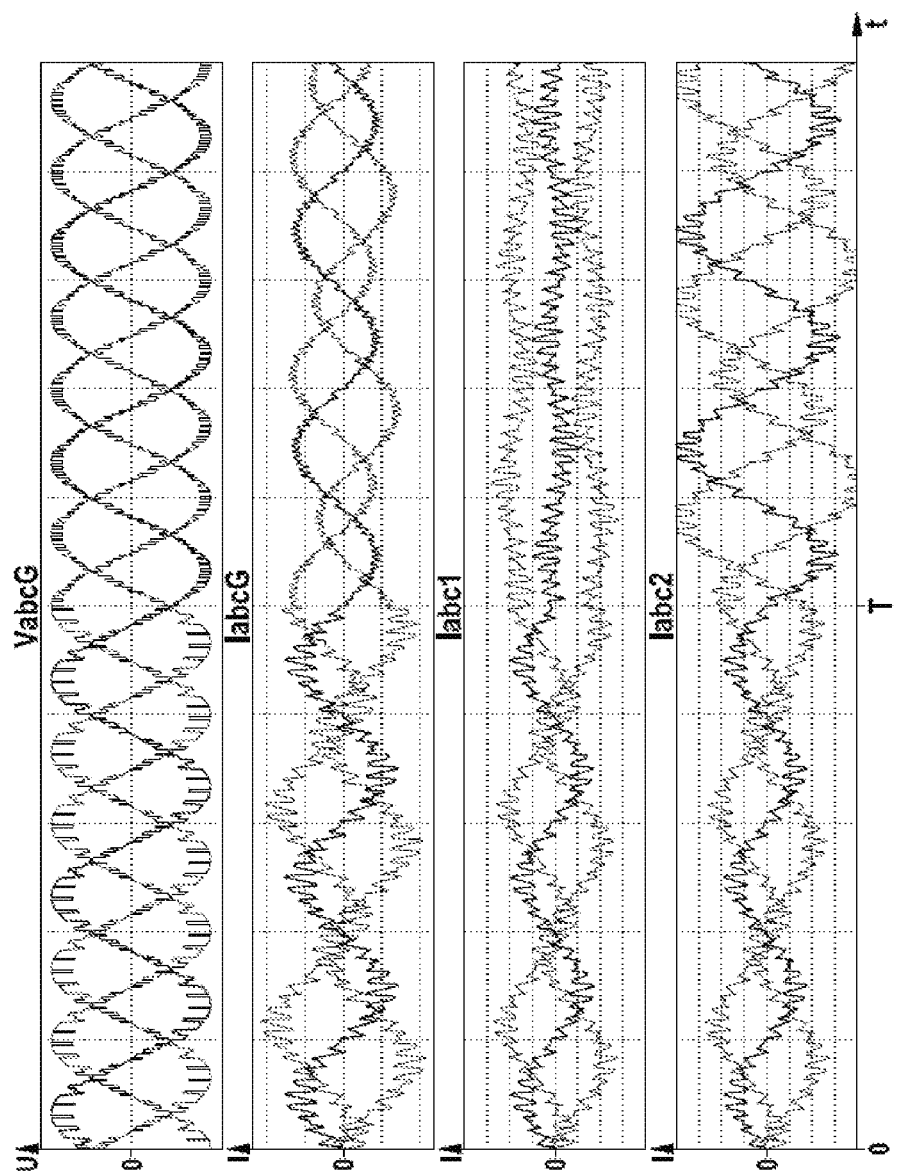
FIG. 6 shows current and voltage profile diagrams for the case of two exemplary converters.

FIG. 6 shows current and voltage profile diagrams for the case of two exemplary converters with identical commutation patterns and a common connection point. Iabc1 corresponds to the current in three phases at the connection point (coupling point E) of converter 1, Iabc2 corresponds to the current at the connection point of converter 2, and IabcG corresponds to the summation current at the connection point. VabcG corresponds to the voltage at the connection point. The profiles of the electrical variables shown relate to a first operating phase, in which the converters have the same fundamental current, before an instant T and a second operating phase after the instant T starting from which one of the converters accepts more active power. In the second operating phase it is evident that the current of the relevant converter increases relative to the other converter. In the second operating phase it can be discerned how the dominant harmonics are compensated for owing to the phase shift on account of the active current shift. That is discernible both in the summation current and in the voltage at the connection point.

FIG. 7 shows current and voltage profile diagrams for the case of two converters with complementary commutation patterns and a common connection point. Iabc1 corresponds to the current in three phases at the connection point of a first converter. Iabc2 corresponds to the current at the connection point of the second converter. IabcG corresponds to the summation current at the connection point, and VabcG corresponds to the voltage at the connection point. In a first operating phase, the converters have the same fundamental current. In the second operating phase starting from the instant T, the second converter accepts more active power and the current of the second converter increases relative to that of the first converter.

In contrast to FIG. 6, the harmonics now compensate for one another in the case of identical active power during the first operating phase. In the case of a phase shift on account of the active current shift, this effect is canceled and a higher distortion in summation current and voltage can be discerned.

FIG. 8 illustrates one example of how the system behaviors illustrated above can be used. FIG. 8 shows current and voltage curves for the case of two converters with a common connection point. At the instant T, from a first operating phase to a second operating phase a changeover of the commutation pattern is carried out in conjunction with a power jump at the same time. During the first operating phase, the converters are driven with complementary commutation patterns. At the instant T, the second converter accepts more active power and the current of the second converter increases relative to that of the first converter. At the same time, the commutation pattern in the second converter is changed over, such that both converters are operated with identical commutation patterns. In this way, despite a power shift, it is possible to attain advantageous operation which brings about a low proportion of harmonics at the connection point by means of the operating phases.

LIST OF REFERENCE SIGNS

1 Energy distribution system
2 Converter
21 First inverter
22 Transformer
23 Second inverter
24 Inverter controller
25 Detection unit
3 Electricity network
4 Energy transmission unit
5 Connection point
6 Identification number
E Coupling point

The invention claimed is:

1. A method for operating a converter in an energy distribution system, wherein, by means of the converter, an electrical energy provided by a source is fed into an AC electricity network at a coupling point or electrical energy is drawn from the AC electricity network at the coupling point, wherein the AC electricity network is coupled at further coupling points to further converters for feeding in or drawing electrical energy, wherein the AC electricity network can be connected to a further electricity distribution network at a connection point in order to feed the electrical energy to remote loads or to obtain the electrical energy from remote energy sources, wherein the converter has an inverter provided with power switches in order to provide an electrical variable, comprising the following steps:

providing one or a plurality of system state variables indicating a system state of the electricity network;
selecting one of a plurality of commutation patterns depending on the one or the plurality of system state variables; and
driving the inverter according to the selected commutation pattern,
wherein the one or the plurality of system state variables comprise(s) at least one of the following variables:
an indication about an active and/or reactive power present at the coupling point;
an indication about a harmonic spectrum of the electrical variable at the connection point in the electricity network;
an indication about an impedance or a frequency-dependent impedance profile of the electricity network at at least one point of the AC electricity network;
an indication about an active and/or reactive power transmitted by the electricity network; and
an indication about a configuration of the energy distribution system,
wherein the one or the plurality of system state variables comprise(s) an indication about a resonant frequency of the energy distribution system, wherein the commutation pattern is selected such that a reduced or no excitation takes place at the resonant frequency.

2. The method as claimed in claim 1, wherein the one of the plurality of commutation patterns is selected depending on identification information identifying the converter.

3. The method as claimed in claim 1, wherein the one or the plurality of system state variables is or are received or detected via an external communication connection.

4. The method as claimed in claim 1, wherein the plurality of selectable commutation patterns, upon provision of an in-phase fundamental of the electrical variable, bring about harmonics which have different phase angles and are provided in antiphase.

5. The method as claimed in claim 1, wherein the plurality of commutation patterns differ from one another in terms of a switching specification and/or a switching frequency.

6. The method as claimed in claim 1, wherein the commutation pattern comprises a predefined switching scheme or a switching scheme generated online.

7. The method as claimed in claim 6, wherein the switching scheme generated online is carrier-based.

8. An energy distribution system comprising a plurality of converters for a plurality of sources of electrical energy, the energy distribution system feeding electrical energy provided by the sources into an AC electricity network at coupling points or for drawing electrical energy from the AC electricity network at the coupling points, wherein the AC electricity network can be connected to a further electricity distribution network at a connection point in order to feed the electrical energy to remote loads or to obtain the electrical energy from remote energy sources,
wherein each of the converters has an inverter provided with power switches for providing an electrical variable, and a control unit for driving the inverter,
wherein the control unit is designed
to obtain one or a plurality of system state variables indicating a system state of the AC electricity network;
to select one of a plurality of commutation patterns depending on the one or the plurality of system state variables; and
to drive the inverter according to the selected commutation pattern,
wherein the control unit is designed to obtain one or a plurality of the following system state variables and to select one of a plurality of commutation patterns depending on the one or the plurality of the following system state variables:
an indication about an active and/or reactive power present at the coupling point;
an indication about a harmonic spectrum of the electrical variable at a connection point or the coupling point in the electricity network;
an indication about an impedance or a frequency-dependent impedance profile of the electricity network at at least one point of the AC electricity network;
an indication about an active and/or reactive power transmitted by the electricity network; and
an indication about a configuration of the energy distribution system
wherein the respective converters are provided with different selection schemes such that, in the case of an indicated system state, the converters select commutation patterns which result in at least one partial cancellation for at least one harmonic of the electrical variable on the AC electricity network.

9. The energy distribution system as claimed in claim 8, wherein the control unit is designed to obtain the one or the plurality of system state variables via an external communication connection, and/or wherein the control unit has a detection unit in order to detect the one or the plurality of system state variables.

10. The energy distribution system as claimed in claim 8, wherein a storage unit for storing identification information is provided, such that one of the plurality of commutation patterns is selected depending on the identification information of the converter.

11. An energy transmission system comprising the converters as claimed in claim 8 and comprising a load that obtains electrical energy via one of the converters, or one of the sources that feed electrical energy into the AC electricity network via one of the converters.

12. The energy distribution system as claimed in claim 8, wherein the converters are operated with a respective commutation pattern that is dependent on the location of their respective coupling point in the electricity network.

13. The energy distribution system as claimed in claim 8, wherein at least two of the converters are designed to be operated with complementary commutation patterns which bring about in antiphase the electrical variables for at least one harmonic in the AC electricity network.

14. The energy distribution system as claimed in claim 8, wherein a detection unit is provided in order to detect the system state and to communicate it to one or a plurality of the converters.

15. The energy distribution system as claimed in claim 8, wherein at least one filter unit is provided in order to carry out a filtering of harmonics in the electricity network depending on the system state.

16. The energy distribution system as claimed in claim 8, wherein the converters are implemented in each case with an assigned selection scheme, such that they are operated with commutation patterns which minimizes the resulting defined harmonic spectrum on the AC electricity network at least in a predefined frequency range.

17. A method for operating the plurality of converters in an energy distribution system as claimed in claim 8, wherein commutation patterns are selected by each of the converters in the case of an indicated system state in accordance with the assigned selection scheme so as to result in at least one partial cancellation for at least one harmonic of the electrical variable on the AC electricity network.

18. A method for operating a converter in an energy distribution system, wherein, by means of the converter, an electrical energy provided by a source is fed into an AC electricity network at a coupling point or electrical energy is drawn from the AC electricity network at the coupling point, wherein the AC electricity network is coupled at further coupling points to further converters for feeding in or drawing electrical energy, wherein the AC electricity network can be connected to a further electricity distribution network at a connection point in order to feed the electrical energy to remote loads or to obtain the electrical energy from remote energy sources, wherein the converter has an inverter provided with power switches in order to provide an electrical variable, comprising the following steps:
providing one or a plurality of system state variables indicating a system state of the electricity network;
selecting one of a plurality of commutation patterns depending on the one or the plurality of system state variables; and
driving the inverter according to the selected commutation pattern,
wherein the one or the plurality of system state variables comprise(s) at least one of the following variables:
an indication about an active and/or reactive power present at the coupling point;
an indication about a harmonic spectrum of the electrical variable at the connection point in the electricity network;
an indication about an impedance or a frequency-dependent impedance profile of the electricity network at at least one point of the AC electricity network;
an indication about an active and/or reactive power transmitted by the electricity network; and an indication about a configuration of the energy distribution system, wherein the commutation pattern comprises a predefined switching scheme or a switching scheme generated online; and wherein the switching scheme generated online is carrier-based.

19. The method as claimed in claim 18, wherein the one of the plurality of commutation patterns is selected depending on identification information identifying the converter.

20. A method for operating a converter in an energy distribution system, wherein, by means of the converter, an electrical energy provided by a source is fed into an AC electricity network at a coupling point or electrical energy is drawn from the AC electricity network at the coupling point, wherein the AC electricity network is coupled at further coupling points to further converters for feeding in or drawing electrical energy, wherein the AC electricity network can be connected to a further electricity distribution network at a connection point in order to feed the electrical energy to remote loads or to obtain the electrical energy from remote energy sources, wherein the converter has an inverter provided with power switches in order to provide an electrical variable, comprising the following steps:

providing one or a plurality of system state variables indicating a system state of the electricity network;

selecting one of a plurality of commutation patterns depending on the one or the plurality of system state variables; and driving the inverter according to the selected commutation pattern, wherein the one or the plurality of system state variables comprise(s) at least one of the following variables:

an indication about an active and/or reactive power present at the coupling point;

an indication about a harmonic spectrum of the electrical variable at the connection point in the electricity network;

an indication about an impedance or a frequency-dependent impedance profile of the electricity network at at least one point of the AC electricity network;

an indication about an active and/or reactive power transmitted by the electricity network; and an indication about a configuration of the energy distribution system, wherein the plurality of selectable commutation patterns, upon provision of an in-phase fundamental of the electrical variable, bring about harmonics which have different phase angles and are provided in antiphase.

* * * * *